(12) United States Patent
Molinari

(10) Patent No.: US 11,745,845 B2
(45) Date of Patent: Sep. 5, 2023

(54) EMERGENCY OPENING DEVICE FOR AN AIRCRAFT DOOR, COMPRISING A TELESCOPIC OPERATING MEMBER

(71) Applicant: LATECOERE, Toulouse Occitaine (FR)

(72) Inventor: Didier Molinari, Balma Occitanie (FR)

(73) Assignee: LATECOERE, Toulouse Occitanie (FR)

( * ) Notice: Subject to any disclaimer, the term of this patent is extended or adjusted under 35 U.S.C. 154(b) by 395 days.

(21) Appl. No.: 17/262,122

(22) PCT Filed: Jul. 23, 2019

(86) PCT No.: PCT/EP2019/069748
§ 371 (c)(1),
(2) Date: Jan. 21, 2021

(87) PCT Pub. No.: WO2020/020860
PCT Pub. Date: Jan. 30, 2020

(65) Prior Publication Data
US 2021/0261233 A1 Aug. 26, 2021

(30) Foreign Application Priority Data

Jul. 24, 2018 (FR) ...................................... 1856875

(51) Int. Cl.
*E05F 1/10* (2006.01)
*B64C 1/14* (2006.01)
(52) U.S. Cl.
CPC .......... *B64C 1/1423* (2013.01); *B64C 1/1407* (2013.01); *E05F 1/105* (2013.01); *E05Y 2800/252* (2013.01); *E05Y 2900/502* (2013.01)

(58) Field of Classification Search
CPC ........ B64C 1/1423; B64C 1/1407; E05F 1/10; E05F 1/105; E05Y 2800/252; E05Y 2900/502
USPC ...... 16/70–72, 80; 188/300; 244/118.5, 131; 267/64.12, 221
See application file for complete search history.

(56) References Cited

U.S. PATENT DOCUMENTS

| 5,289,615 | A | 3/1994 | Banks | |
| 9,702,176 | B2 * | 7/2017 | Janak | E05F 1/105 |
| 10,570,935 | B2 * | 2/2020 | Koscielniak | F15B 15/227 |
| 2002/0184733 | A1 | 12/2002 | Lin | |
| 2016/0002965 | A1 | 1/2016 | Janak | |
| 2021/0348430 | A1 * | 11/2021 | Molinari | B64C 1/1423 |

(Continued)

FOREIGN PATENT DOCUMENTS

DE 202016003562 9/2017
EP 0741073 11/1996
(Continued)

*Primary Examiner* — Christopher P Schwartz
(74) *Attorney, Agent, or Firm* — Defillo & Associates, Inc.; Evelyn A. Defillo

(57) ABSTRACT

An emergency opening device for an aircraft door provided with an opening mechanism including an actuating device (2, 5) for the opening mechanism, which includes a tubular operating member (2); elastic compression device (5); an activation device (31) for the actuation device (2,5); the operating member (2) includes a first end element (10) and a second end element (11) which are freely translatable movable relative to each other along the movement axis (X).

18 Claims, 8 Drawing Sheets

(56) References Cited

U.S. PATENT DOCUMENTS

2021/0348431 A1\* 11/2021 Capron ................. B64C 1/1423
2022/0003032 A1\* 1/2022 Capron ..................... E05F 1/10

FOREIGN PATENT DOCUMENTS

| EP | 2644495 | 10/2013 |
|---|---|---|
| FR | 2830564 | 4/2003 |
| FR | 2864021 | 6/2005 |
| FR | 2975967 | 12/2012 |

\* cited by examiner

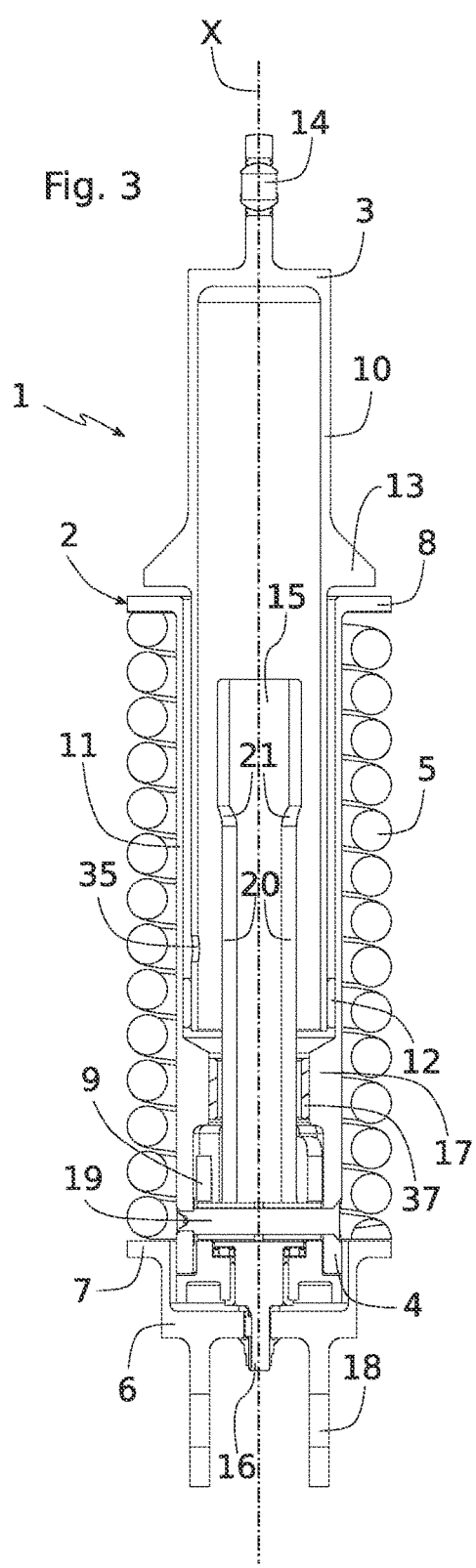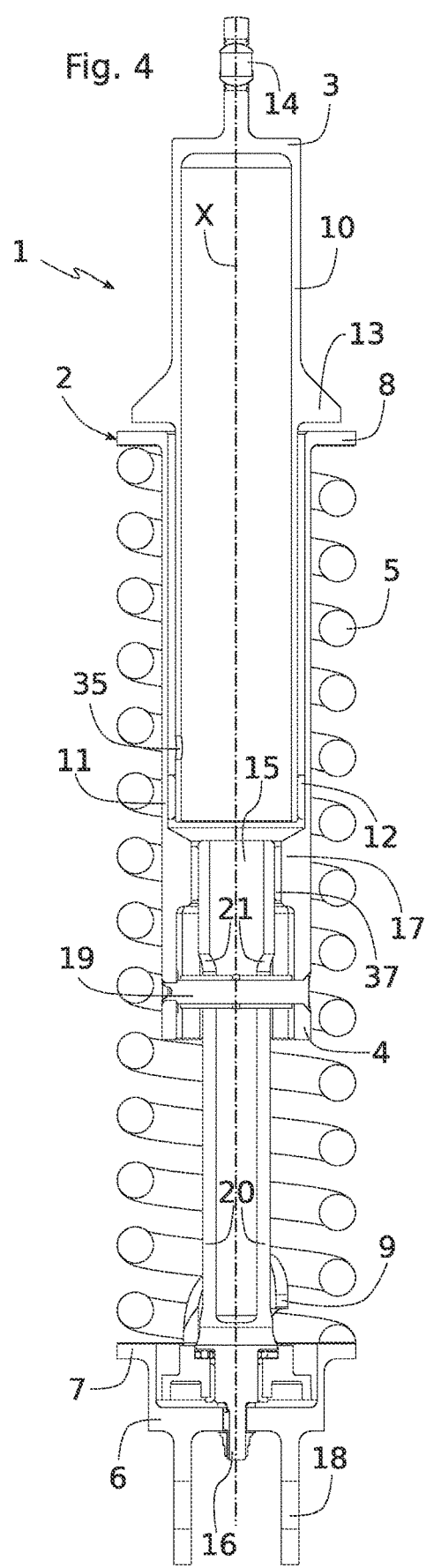

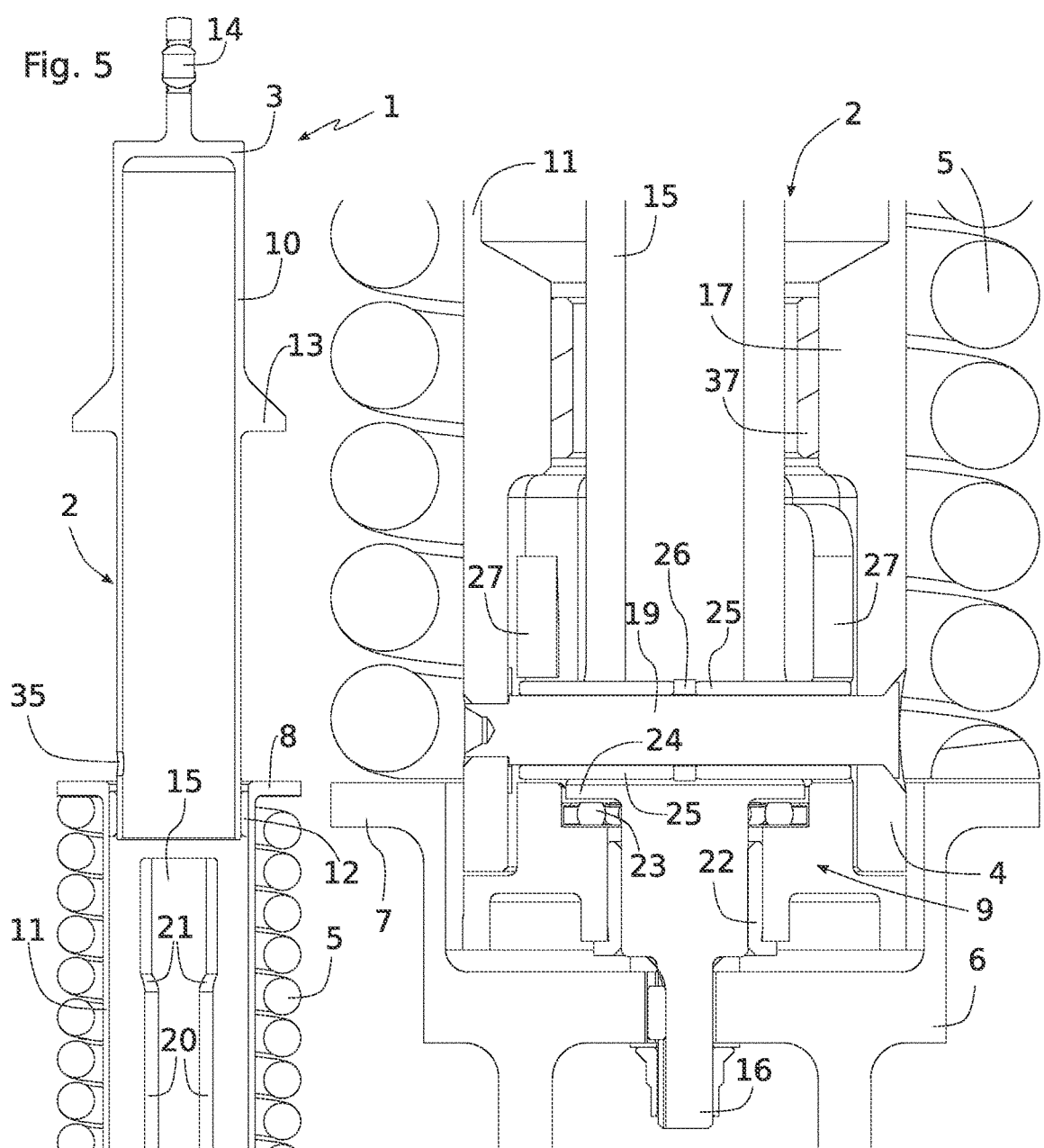
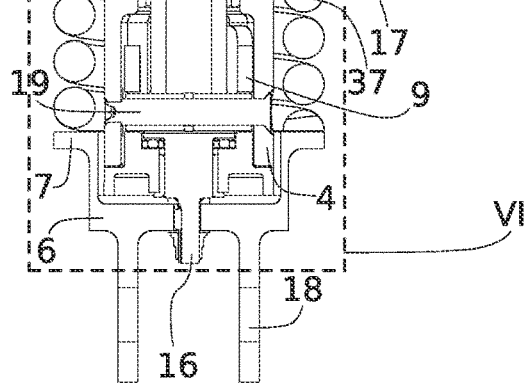
Fig. 5
Fig. 6

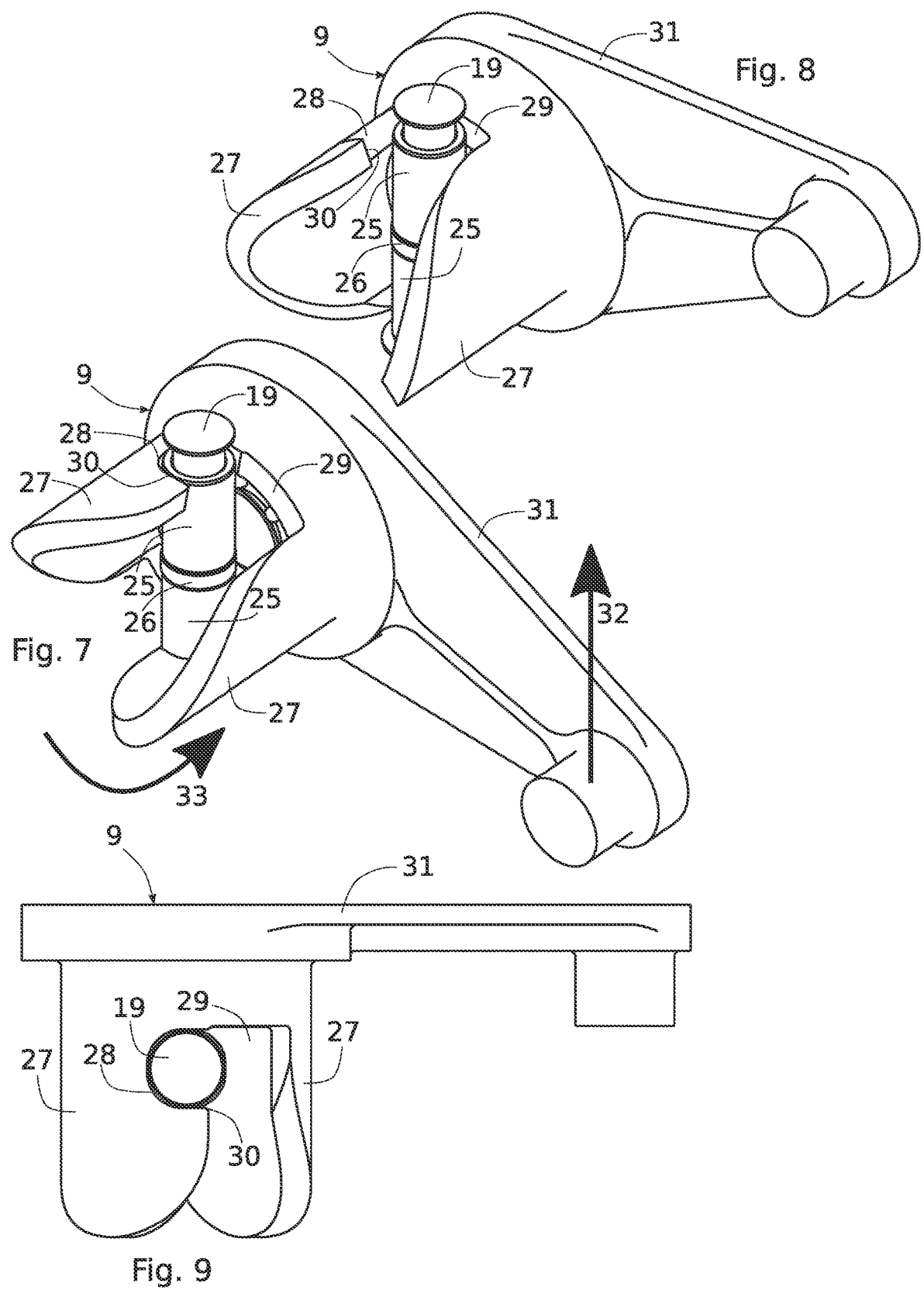

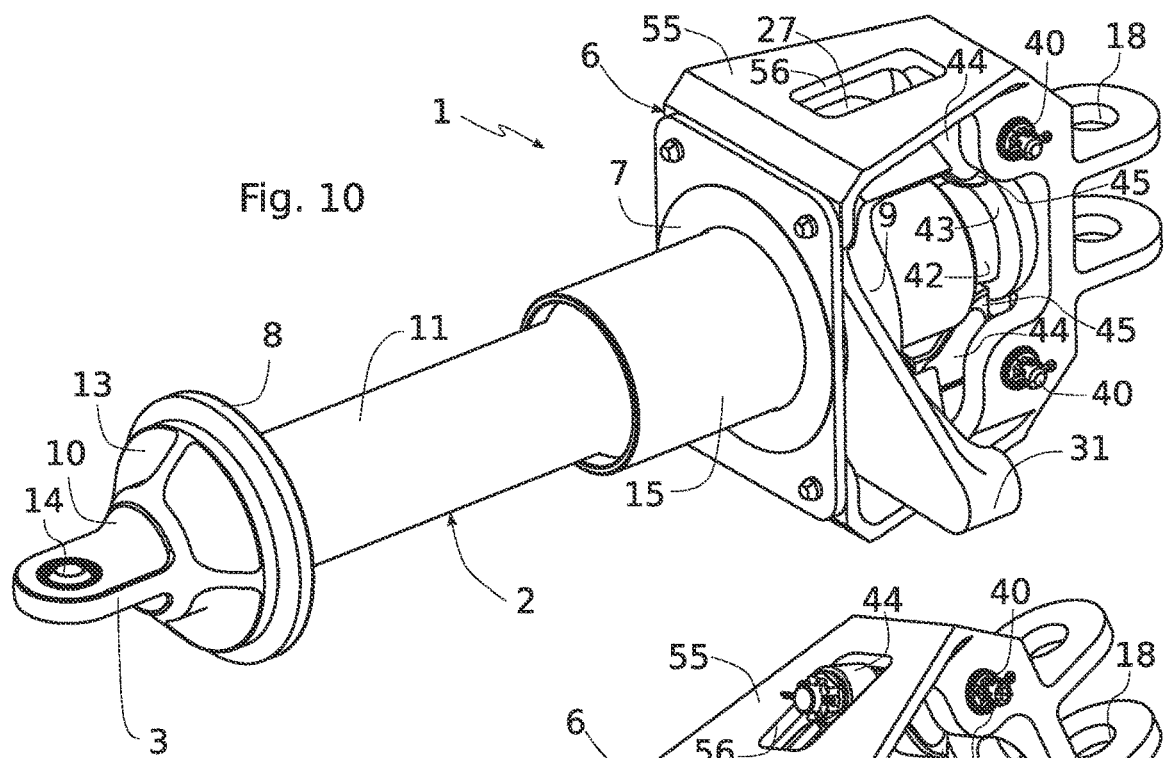
Fig. 10
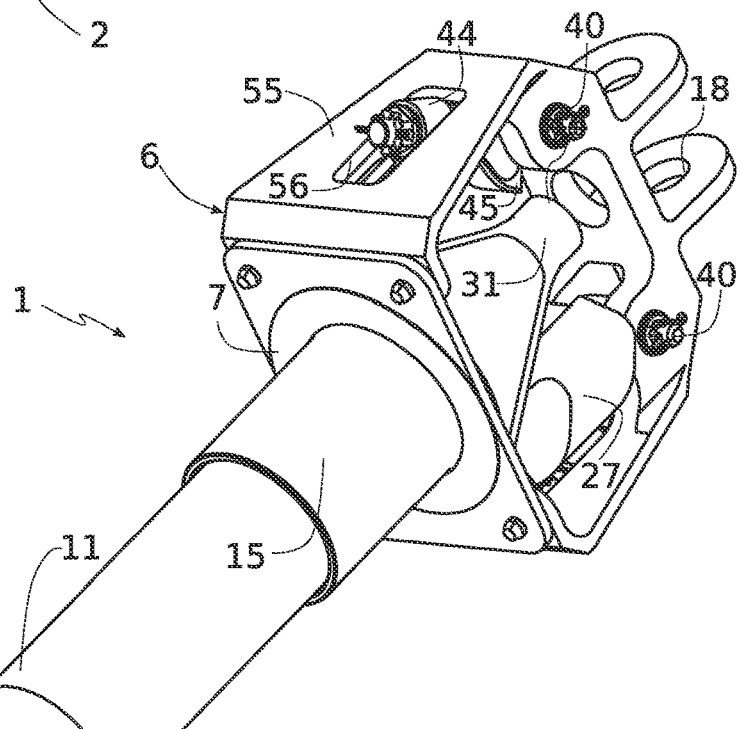
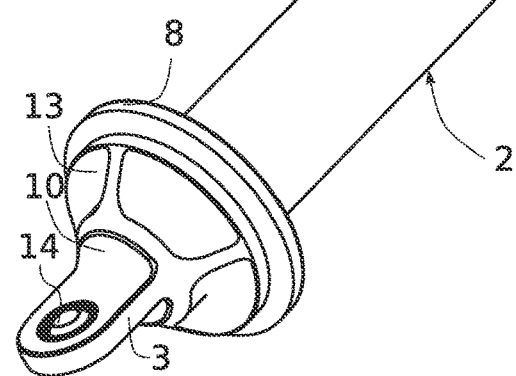
Fig. 11

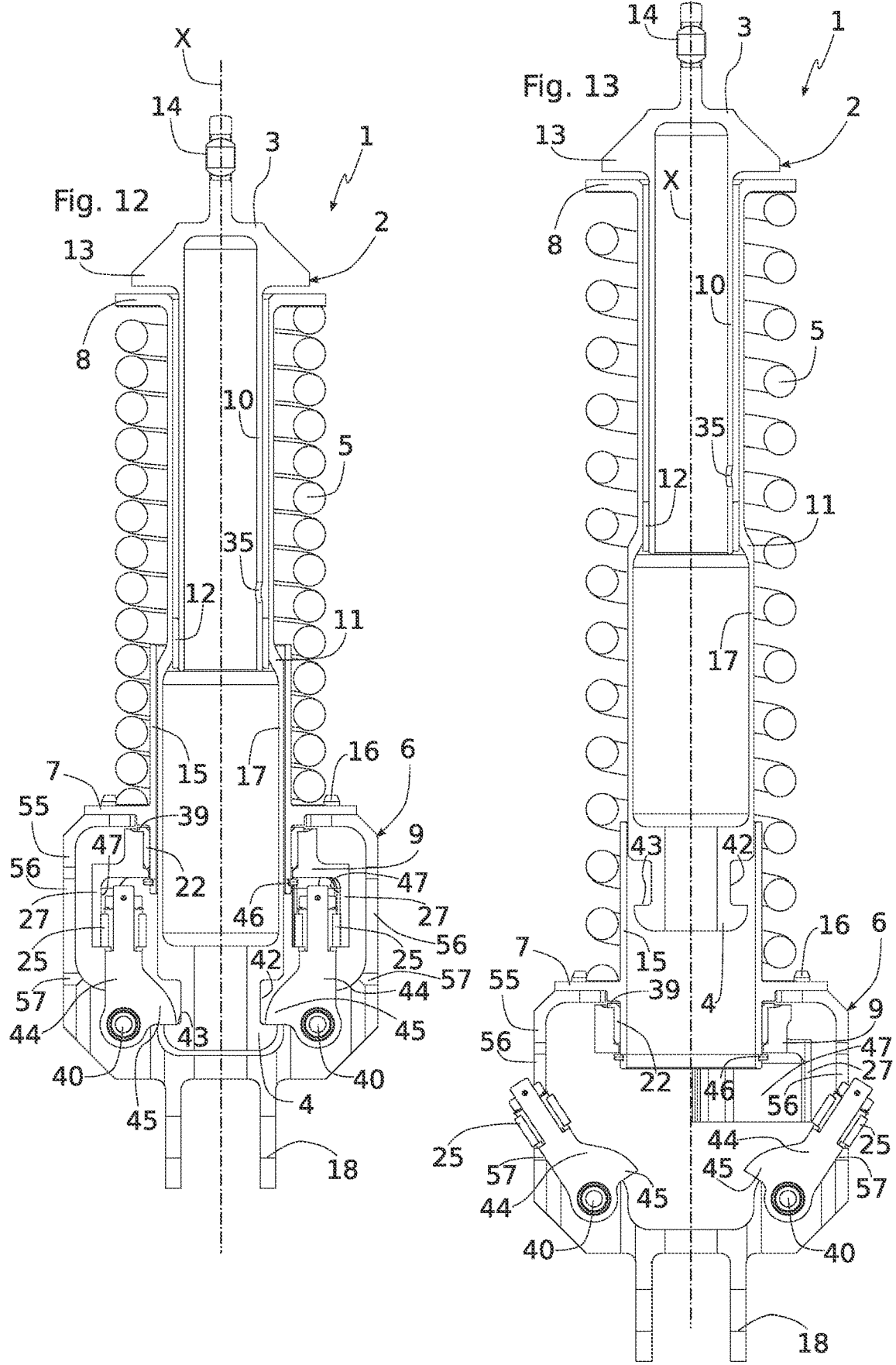

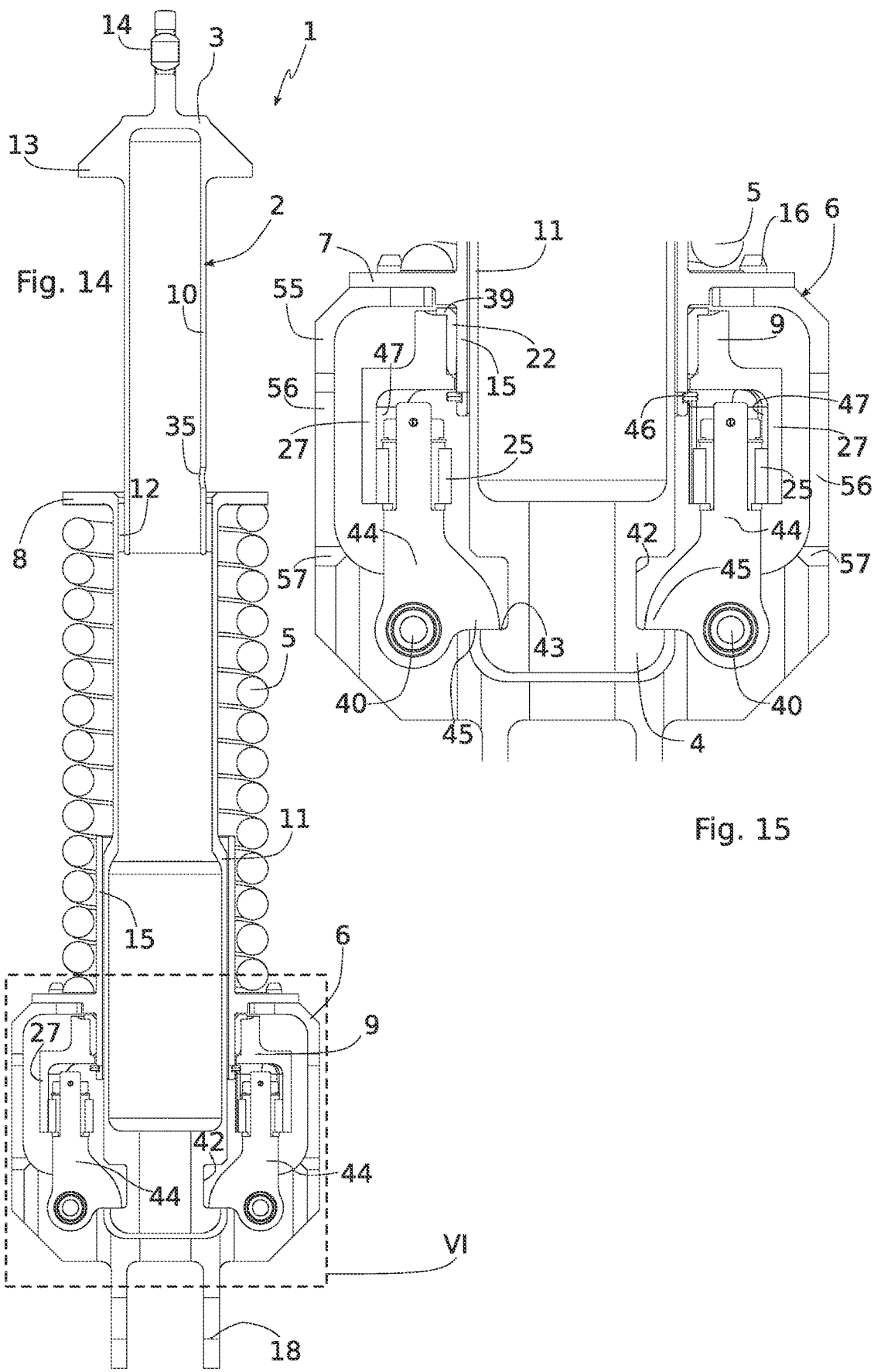

EMERGENCY OPENING DEVICE FOR AN AIRCRAFT DOOR, COMPRISING A TELESCOPIC OPERATING MEMBER

CROSS REFERENCE TO RELATED APPLICATION

This application is a national stage entry of PCT/EP2019/069748 filed Jul. 23, 2019, under the International Convention claiming priority over French Patent Application No. 1856875 filed Jul. 24, 2018.

TECHNICAL FIELD

The invention relates to the field of aeronautics and concerns an emergency opening device for an aircraft door fitted with an opening mechanism.

Aircraft doors comprising an opening mechanism can be opened in order to allow passengers to exit and to enter, or to allow evacuation in an emergency situation. In the event of an emergency evacuation of the passengers, the aircraft doors, whether these be passenger doors or emergency evacuation doors, usually comprise an emergency opening device which, if activated, brings about rapid and effortless opening of the doors, without the need for human intervention.

Such emergency opening devices conventionally comprise means for actuating the door-opening mechanism, which means can switch between a passive state and an active state of activating the opening mechanism (which brings about the opening of the door), and means for activating the actuating means (which allow a user to initiate the emergency opening).

PRIOR ART

At the present time, as notably described in patent applications FR2830564 and EP0741073, the actuating means conventionally consist of an actuator of pneumatic type powered by means of an ancillary reserve of driving fluid. Such actuating means do, however, have a number of disadvantages. Specifically, and in the first place, they are relatively weighty and relatively bulky, notably because of the presence of the ancillary reserve of driving fluid. In addition, they require periodic checks on the pressure of the driving fluid, and require the ancillary reserve to be replaced periodically even if it has not been used. Finally, following activation of the emergency opening device, these actuating means, in order to be returned to an operational status, require the ancillary reserve of driving fluid to be replaced.

Another current solution notably described in patent application FR2864021 allows the bulkiness and weight of the actuating means to be reduced. Specifically, with this solution, the actuating means consist of a pyrotechnic ram, that is to say an autonomous ram that does not need to be supplied from a source of driving fluid. On the other hand, such pyrotechnical rams have to be periodically inspected and replaced even if not used. These pyrotechnic rams also have to be replaced after the emergency opening device has been activated.

Patent application FR2975967 describes an aircraft emergency opening device which overcomes the abovementioned disadvantages. That emergency opening device consists of actuating means of mechanical design making it possible to dispense with pneumatic or pyrotechnic elements. Furthermore, the emergency opening device described additionally performs a service opening function allowing the door to open and close in normal operation, that is to say outside of emergency opening phases. The weight and bulkiness of the emergency opening device are thus reduced in comparison with the devices described hereinabove, the reliability is increased, and this device requires little or no maintenance. However, this mechanical device remains heavy and bulky whereas reducing the on-board mass and the compactness of the equipment are among the priorities in improving aircraft.

DISCLOSURE OF THE INVENTION

The object of the invention is to improve the emergency opening devices of the prior art by providing such a device of which the mass and bulkiness are greatly reduced.

To this end, the invention concerns an emergency opening device for an aircraft door fitted with an opening mechanism, comprising:

actuating means designed to actuate the opening mechanism, which can switch between a passive state and an active state of activating the opening mechanism, and which comprise: a tubular operating member provided with a first end designed to be connected to the door, and with a locking second end; elastic compression means arranged between a fixed end-stop element and the operating member; a retainer for restraining the locking second end, able to move between a closed position of locking of the locking second end, in a position of the operating member corresponding to the passive state of the actuating means in which position the elastic means are kept compressed, and an open position of releasing of the locking second end allowing the operating member to move along an axis of movement toward a position corresponding to the active state of the actuating means, under the effect of the force resulting from the expansion of the elastic means;

means for activating the actuating means designed to bring about the opening of the retainer;

this emergency opening device additionally comprising the following features:

the operating member comprises a first-end element and a second-end element which are able to move freely relative to one another in translation along the axis of movement, the first end of the operating member being situated on the first-end element and the locking second end of the operating member being situated on the second-end element;

the fixed end-stop element comprises fixing means for fixing it to an aircraft door element;

an axis cylinder extending along the axis of movement is fixed to the fixed end-stop element, the second-end element being mounted with the ability to slide along the axis of movement on the axis cylinder;

the retainer comprises a rotary latch that can be opened under load capable of rotational motion about the axis of movement, the rotary latch being axially fixed on the axis cylinder between two axial end-stops, the rotary latch being in non-sliding pivoting connection with the axis cylinder, the rotary latch comprising at least one blade extending parallel to the axis of movement and designed to retain, by traction on a stop surface, the locking second end of the second-end element;

the means for activating the actuating means comprise a lever solidly attached to the rotary latch and allowing the latch to be forced to rotate.

In the present description and the claims, the expression "connected to the door" means relative to the aircraft door in the broadest sense. The aircraft door in the broadest sense includes the opening panel of the door, the door-opening mechanism, or else the structure framing the door and connected to the fuselage (corresponding to the doorpost). Thus, the first end of the actuating member is connected to one element of the door (opening panel, opening mechanism, or framing structure) and the fixed end-stop element is connected to another element of the door (opening panel, opening mechanism, or framing structure) which elements are such that expansion of the elastic means causes actuation of the door-opening mechanism and actual opening of the door. For example, the first end of the actuating member may be fixed to the door-opening mechanism, and the fixed end-stop element may be fixed to the opening panel of the door. In another example, the first end of the actuating member may be fixed to the opening panel of the door, and the fixed end-stop element may be fixed to the structure framing the door.

Such an emergency opening device offers all the advantages of a mechanical device as described in document FR2975967. The mechanical design of the actuating means requires no special maintenance while the opening device is not used. The use of the opening device does not require the replacement of a triggering member, as is required with pneumatic or pyrotechnic devices. No driving fluid is required for activating the actuating means.

The emergency opening device according to the invention additionally offers reduced mass and reduced bulkiness. All the functions associated with triggering emergency opening and associated with in-service opening are grouped together around the one same axis of movement of the actuating member. Such a device forms an end-product of the fully autonomous mechanical ram type, which is a hallmark of operational reliability and safety, both of which are highly sought after in the field of aeronautics and more especially of emergency opening devices. In addition to the weight saving, which is a feature that is critical in aeronautics, the compactness of the device allows it to be installed within complex aircraft doors comprising numerous items of equipment such as safety devices, windows, viewing devices, various assistance devices, esthetic trims, etc.

The device according to the invention is also fully mechanical and requires no connection to an external source of energy or to a remote-operation device. Although the device according to the invention is fully mechanical and autonomous, it may comprise highly rated elastic means, namely means intended to apply a significant opening force to the door-opening mechanism, something which is needed in this emergency door-opening application. Despite the high rating of the elastic elements, the actuating means can be activated effortlessly because of the rotary retainer.

The emergency opening device according to the invention may include the following additional features, either individually or in combination:

the first-end element and the second-end element are mounted slidingly on one another;

the first-end element and the second-end element are nested one inside the other;

the first-end element and the second-end element consist of tubular elements;

the first-end element and the second-end element consist of tubes, the tube constituting the first-end element being inserted inside the tube constituting the second-end element;

the operating member comprises a sliding bearing allowing the first-end element to slide over the second-end element;

the second-end element comprises abutment means for the elastic means;

the abutment means for the elastic means comprise a flange solidly attached to the second-end element;

the elastic means are positioned between the fixed end-stop element and the abutment means;

the first-end element comprises an end-stop collaborating with the abutment means so that when the actuating means are in the active state, the second-end element drives the first-end element;

the end-stop comprises a flange solidly attached to the second-end element;

the operating member is mounted with the ability to move translationally along the axis of movement on an axis cylinder fixed on the fixed end-stop element;

the second-end element is mounted with the ability to slide around the axis cylinder;

the second-end element comprises a sliding portion tailored to fit the axis cylinder;

the sliding portion comprises a sliding bearing;

the second-end element is mounted with the ability to slide inside the axis cylinder;

the second-end element comprises a sliding portion tailored to fit the axis cylinder;

the device comprises an end-of-travel stop for the sliding of the operating member with respect to the axis cylinder;

the first-end element comprises coupling means for coupling the device to the door;

the first-end element comprises a condensate discharge hole.

DESCRIPTION OF THE FIGURES

Further features and advantages of the invention will become apparent upon reading the following non-limiting description, with reference to the appended figures, in which:

FIG. 3 is a view in longitudinal section of the device in its position of FIG. 1;

FIG. 4 is a view in longitudinal section of the device in its position of FIG. 2;

FIG. 5 is similar to FIG. 3, with the operating member in the service-opening position;

FIG. 6 is an enlarged view of the rectangle VI of FIG. 5;

FIG. 7 depicts the retainer and the axial retaining finger of the device in its position of FIG. 1;

FIG. 8 is a perspective depiction of the retainer and the axial retaining finger of the device in its position of FIG. 2;

FIG. 9 depicts the elements of FIG. 7, viewed from above;

FIG. 10 is a perspective view of an emergency opening device according to a second embodiment of the invention, in its passive state;

FIG. 11 depicts the device of FIG. 10 in its active state;

FIG. 12 is a view in longitudinal section of the device of FIG. 10 in its position of FIG. 10;

FIG. 13 is a view in longitudinal section of the device of FIG. 10 in its position of FIG. 11;

FIG. 14 is similar to FIG. 12, with the operating member in the service-opening position;

FIG. 15 is an enlarged view of the rectangle XV of FIG. 14;

DETAILED DESCRIPTION

FIGS. 1 to 9 illustrate a first embodiment of the invention.

Figure 1:
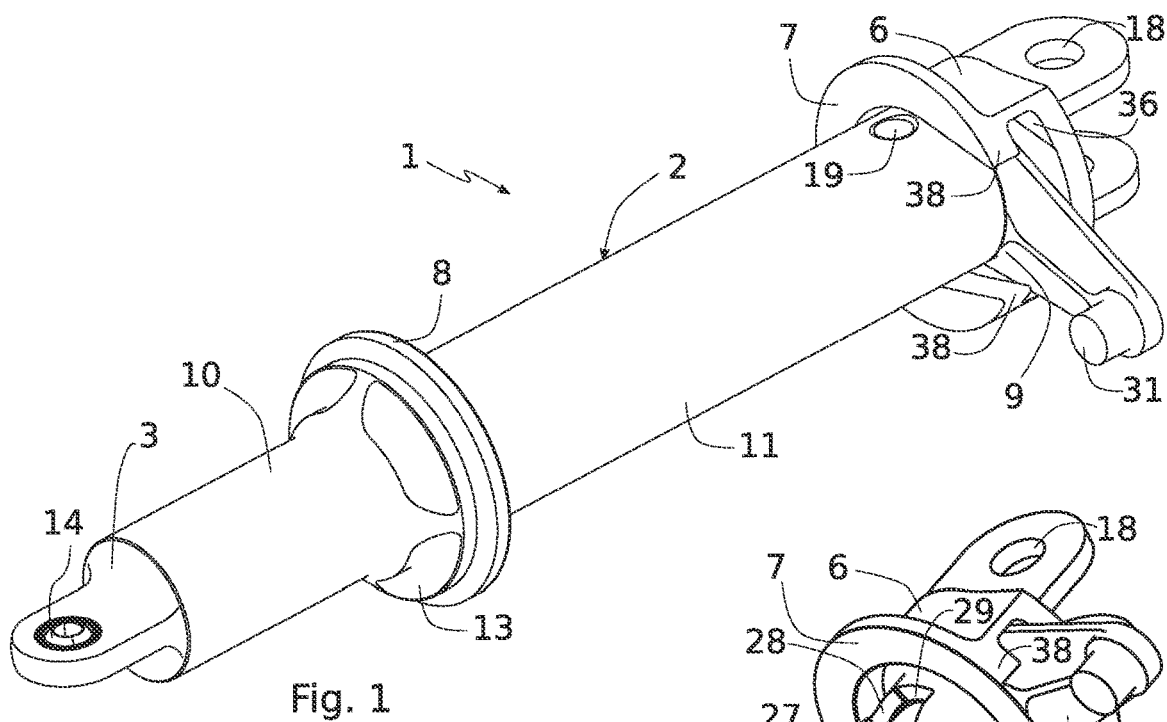
FIG. 1 is a perspective view of an emergency opening device according to a first embodiment of the invention, in its passive state.
Figure 2:
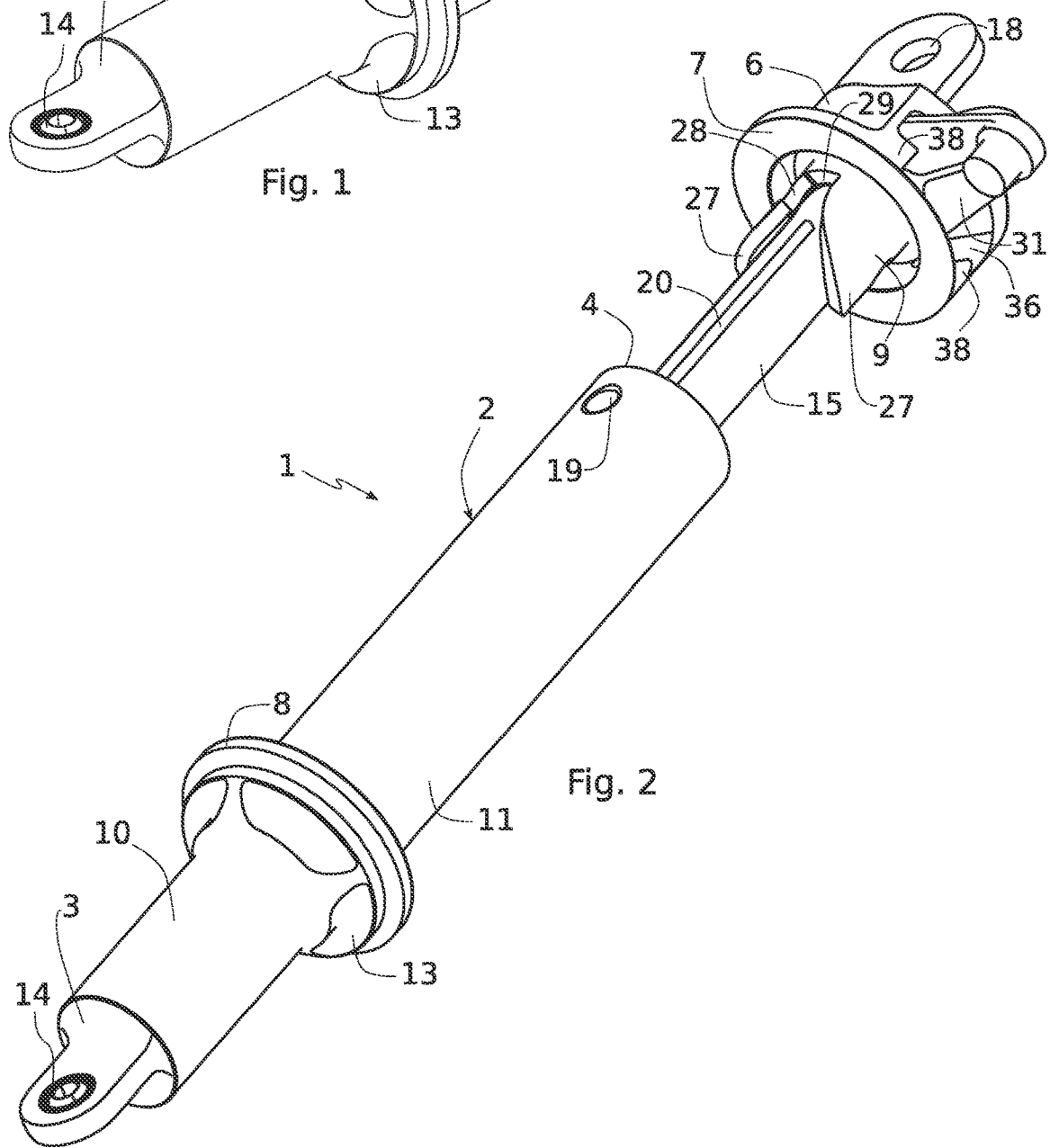
FIG. 2 depicts the device of FIG. 1 in its active state.

The aircraft door emergency opening device 1 according to this first embodiment is depicted in perspective in FIGS. 1 and 2, in its active state and in its passive state, respectively. This device 1 is intended to be connected by its ends to elements of the aircraft door in such a way that expansion of this device 1 (in the active state, FIG. 2) brings about the emergency opening of the door.

This emergency opening device 1 can be positioned on any type of aircraft door or opening panel that has an opening mechanism. Aircraft door-opening mechanisms are well known and not described in further detail here. The device 1 may for example be mounted in such a way as to collaborate with a door-opening mechanism having a chain transmission, as described in document FR2975967, or else in other known opening mechanisms such as mechanisms involving link rods forming a deformable parallelogram.

Whatever the type of aircraft door-opening mechanism, the emergency opening device 1, when activated by a user, allows rapid and automatic opening of the aircraft door so that this aircraft can be evacuated.

With reference to FIGS. 3 and 4, the device 1 comprises means for actuating the door-opening mechanism, which means can switch between the passive state of FIG. 1 and the active state of FIG. 2. In the passive state, the device 1 applies no load to the door or the door-opening mechanism, and the emergency opening function is not activated; this corresponds to the normal state of operation of the door opening-mechanism. In the active state, in the event of an emergency and when the aircraft needs to be evacuated, the door-opening mechanism is activated by a force exerted by the device 1 until the door is fully open (device 1 in the position of FIGS. 2 and 4).

With reference to FIGS. 3 and 4, these means for actuating the door-opening mechanism comprise a tubular operating member 2 which is able to move along an axis of movement X which is the longitudinal axis thereof. This operating member 2 comprises a first end 3 for connecting to a door element which has not been depicted (for example the opening mechanism) and comprises a second end 4 referred to as the locking end.

The first end 3 comprises a ball-joint ball 14 allowing the device 1 to be coupled to an element of the door.

Throughout the description and the claims, the references "axial" and "radial" are with reference to the axis X.

The actuating means also comprise elastic compression means which here consist of a cylindrical spring 5 which is placed between a fixed end-stop element 6 and the operating member 2. In FIGS. 1 and 2, the spring 5 has not been depicted in order to simplify the figure. The fixed end-stop element 6 comprises a flange 7 against which one end of the spring 5 can abut, and the operating member 2 also comprises a flange 8 against which the other end of the spring 5 can abut. When the actuating means are in the passive state, the spring 5 is compressed and the two flanges 7, 8 are as close-together as they can be, whereas in its active state, the two flanges 7, 8 are moved away from one another under the effect of the force of the spring 5. The fixed end-stop element 6 comprises two fixing holes 18 for fixing it to an element of the aircraft door in such a way that expansion of the spring 5 will bring about the opening of this door.

The actuating means of the device 1 additionally comprise a retainer for restraining the locking second end 4 of the operating member 2, this retainer here consisting of a rotary latch 9 which is able to rotate about the longitudinal axis of the operating member 2.

The operating member 2 is a telescopic element made up of a first-end tube 10 and of a second-end tube 11 able to slide one inside the other. In the present example, the first-end tube 10 has an outside diameter smaller than the inside diameter of the second-end tube 11 so that the first-end tube 10 can be inserted inside the second-end tube 11 over a nesting portion. A sliding bearing 12, made from a material having a low coefficient of friction, is also mounted between the first-end tube 10 and the second-end tube 11 so that the sliding of the first-end tube 10 with respect to the second-end tube 11 causes the sliding bearing 12 to slide against the internal walls of the second-end tube 11. A hole 35 made in the first-end tube 10 allows any condensate that might form inside the device 1 to be discharged. The telescopic nature of the operating member 2 allows for a function referred to as the service-opening function described later on. FIG. 5 depicts the device 1 with the operating member 2 in the service-opening position.

The first-end tube 10 thus constitutes the first end 3 of the operating member 2. The first-end tube 10 is additionally provided with a flange 13 collaborating with the flange 8 which, for its part, is made on the second-end tube 11. The two flanges 8, 13 collaborate in such a way that, when the spring 5 pushes on the operating member 2 (active state of the actuating means, see FIG. 4), the spring 5 bears against the flange 8 which itself bears against the flange 13 and therefore pushes back on the whole operating member 2, moving it away from the fixed end-stop element 6. The first-end tube 10 is therefore nested to its maximum extent inside the second-end tube 11, with the flanges 8, 13 butting against one another.

The whole of the operating member 2 (which is therefore made up of the first-end tube 10 and of the second-end tube 11) can move longitudinally, along the axis X, between the two extreme positions of FIGS. 3 and 4, when emergency opening is triggered. This movement of the operating member 2 is achieved by sliding of the operating member 2 on an axis cylinder 15. The axis cylinder 15 is a cylinder fixed to the fixed end-stop element 6 by screw-fastening means 16. The axis cylinder 15 provides a sliding connection for guiding the operating member 2 longitudinally, along the axis X, by virtue of a sliding portion 17 equipped with a sliding bearing 37, of the second-end tube 11.

The operating member 2 performs its service-opening function, in addition to the emergency opening function, thanks to its telescopic nature, allowing the aircraft door to be opened and closed under normal conditions of use, namely outside of emergency opening periods, the emergency opening device being kept in a passive state, and the spring 5 remaining compressed. For this function, relative sliding between the first-end tube 10 and the second-end tube 11 along the axis X is possible thanks to the sliding bearing 12 described hereinabove.

When the device 1 is in its position of FIG. 3, the aircraft door is closed. Starting from this position, there are two ways in which the door can open:

an emergency opening mode in which the actuating means are activated. Expansion of the spring 5 will then cause the fixed end-stop element 6 and the second-end tube 11 to move apart (because of the flanges 7, 8). The flange 8 will additionally itself drive the flange 13, and therefore the first-end tube 10, along the axis X. The whole operating member 2 therefore arrives in the position of FIGS. 2 and 4, the door being opened as a result of the thrusting action of the spring 5;

a service-opening mode in which the first-end tube 10 slides freely inside the second-end tube 11, under the effect of the door being opened by an external action, as far as the position of FIG. 5 which corresponds to the full opening of the aircraft door.

In order to allow the operating member 2 to be locked in its position of FIGS. 1 and 3, the second-end tube 11 comprises an axial retaining finger 19 passing all the way through the tube 11 along a diameter. The finger 19 may consist, for example, of a solid metal rod, of a pin, or of a bolt, which can be screwed or crimped onto the tube 11.

The finger 19 is inserted into a double slot 20 made in the axis cylinder 15, preventing relative rotation of the second-end tube 11 with respect to the axis cylinder 15 about the longitudinal axis. A sliding connection is thus created between the operating member 2 and the axis cylinder 15.

The finger 19 additionally provides an end-of-travel stop function. In the end-of-travel position of FIG. 4, the operating member 2 is halted by the abutment of the finger 19 against end surfaces 21 of the double slot 20.

FIG. 6 is an enlarged view of the rectangle VI of FIG. 3. In this locked position, the rotary latch 9 is in the closed position and collaborates with the finger 19 to restrain the second end 4 of the operating member 2.

The rotary latch 9 is mounted on the axis cylinder 15 with a pivot connection that allows it to rotate about the axis X, thanks to a sliding ring 22 that has a low coefficient of friction. The rotary latch 9 is fixed axially to the axis cylinder 15 between two sliding axial end-stops consisting of a thrust ball bearing 23 placed between the rotary latch 9 and a shoulder 24 of the axis cylinder 15, and by an axial stop flange 39 of the sliding ring 22.

The rotary latch 9 is thus in a non-sliding pivot connection on the axis cylinder 15. The thrust ball bearing 23 and the sliding ring 22 allow the rotary latch 9 to rotate with respect to the axis cylinder 15 with very low friction force. The rotary latch 9 is solidly attached to an activation means consisting of a lever 31 allowing the latch 9 to be forced to rotate. The lever 31 is able to move in a working window 36 made in the fixed end-stop element 6 and interrupting the flange 7 on which the spring 5 can abut (see FIGS. 1 and 2). The fixed end-stop element 6 comprises two projections 38 maximizing the bearing surface for the springs 5, considering the presence of the working window 36.

The finger 19 also comprises two rolling rings 25 in the continuation of one another, with an annular separator 26 between the two rolling rings 25. The two rolling rings 25, and possibly also the annular separator 26, are in pivot connection with the finger 19, with the possibility of rotating about the longitudinal axis of the finger 19.

The collaboration between the rotary latch 9 and the finger 19 will be described with reference to FIGS. 7 and 8 which depict only these two members 9, 19 for the purposes of the description. In FIG. 7, the rotary latch 9 is in its closed position in which it restrains the finger 19, and therefore the second end 4 of the operating member 2, against the action of the spring 5 which is compressed (which corresponds to the position of FIG. 3). In FIG. 8, the rotary latch 9 is in its open position in which it no longer restrains the finger 19, this corresponding to the releasing of the second end 4 of the operating member 2, prior to expansion of the spring 5 which will lead to the position of FIG. 4.

The rotary latch 9 comprises two opposite blades 27 which each comprise a hook 28, these two blades 27 extending axially, namely parallel to the axis X. Two slots 29 are made between the two blades 27 so that, in the open position of FIG. 8, the finger 19 of the second end 4 can be inserted into the bottom of the slots 29 and, in the closed position of FIG. 7, rotating the rotary latch 9 toward its closed position causes the finger 19 to be restrained by the hooks 28.

FIG. 9 is a view of FIG. 6 from above and shows the collaboration between a hook 28 and the finger 19. The hook 28 restrains the finger 19 via a stop surface 30 against which the finger 19 is forced by the force of the spring 5. The stop surface 30 is orthogonal to the axis X.

The rotary latch 9 is thus able to restrain the second end 4 of the second-end element 11 thanks to the blades 27, by pulling against the stop surface 30.

When the device 1 is in the position of FIGS. 1 and 3, the rotary latch 9 being in its closed position of FIG. 7, emergency opening can be actuated by a user by actuating the lever 31 in the direction of the arrow 32 of FIG. 7, which causes the rotary latch 9 to rotate in the direction of the arrow 33. Each rolling ring 25 will then roll along the stop surface 30 (each rotating with respect to the finger 19 but in an opposite direction) as far as the position of FIG. 8 in which the rotary latch 9 is in the open position and in which the operating member 2, which is then no longer restrained, is immediately thrust by the spring 5 toward its position of FIG. 4, bringing about an emergency opening. The annular separator 26 allows the rolling rings 25 to rotate in two opposite directions.

The rotary latch 9 thus constitutes a latch that can be opened under load because it allows the operating member 2 to be released in the emergency opening mode, this release being achieved without compressing the spring 5.

Optionally, the lever 31 may also be secured against undesired triggering by a pin, such as a quick-release pin with spring-loaded ball.

Variants of this first embodiment may be envisioned without departing from the scope of the invention. For example, the blades 27 of the rotary latch 9 may surround the second-end tube 11 on the outside, rather than being inserted inside this tube 11. The finger 19 would then project on each side of the second-end tube 11 in order to collaborate with the hooks 28.

Furthermore, the number of blades 27 and of hooks 28 may vary, at least one hook 28 being needed to collaborate with the finger 19.

Activation of the emergency opening device 1 can be achieved by means other than a lever, for example by a rack used to rotate the rotary latch 9.

The axis cylinder 15 may for example surround the second-end tube 11, instead of the reverse.

FIGS. 10 to 17 illustrate a second embodiment of the invention. Elements that are similar between the first embodiment and the second embodiment reuse the same numerals for reference to the figures.

The aircraft door emergency opening device 1 according to this second embodiment of the invention is depicted in perspective in FIGS. 10 and 11, in its passive state and in its active state, respectively. This device 1 is intended to be connected by its ends to elements of the aircraft door in such a way that expansion of this device 1 (in the active state, FIG. 11) brings about the emergency opening of the door.

With reference to FIGS. 12 and 13, the device 1 comprises means for actuating the door-opening mechanism, which means can switch between the passive state of FIG. 10 and the active state of FIG. 11. In the passive state, the device 1 applies no load to the door or the door opening mechanism, and the emergency opening function is not activated; this corresponds to the normal state of operation of the door opening mechanism. In the active state, in the event of an emergency and when the aircraft needs to be evacuated, the door opening mechanism is activated by force exerted by the device 1 until the door is fully open (device 1 in the position of FIGS. 11 and 13).

With reference to FIGS. 12 and 13, these means for actuating the door-opening mechanism comprise a tubular operating member 2 which is able to move along an axis of movement X which is the longitudinal axis thereof. This operating member 2 comprises a first end 3 for connecting to a door element which has not been depicted (for example the opening mechanism) and comprises a second end 4 referred to as the locking end. The first end 3 comprises a ball-joint ball 14 allowing the device 1 to be coupled to an element of the door.

The actuating means also comprise elastic compression means which here consist of a cylindrical spring 5 which is placed between a fixed end-stop element 6 and the operating member 2. In FIGS. 10 and 11, the spring 5 has not been depicted in order to simplify the figure. The fixed end-stop element 6 comprises a flange 7 against which one end of the spring 5 can abut, and the operating member 2 also comprises a flange 8 against which the other end of the spring 5 can abut. When the actuating means are in the passive state, the spring 5 is compressed and the two flanges 7, 8 are as close-together as they can be, whereas in its active state, the two flanges 7, 8 are moved away from one another under the effect of the force of the spring 5. The fixed end-stop element 6 comprises two fixing holes 18 for fixing it to an element of the aircraft door in such a way that expansion of the spring 5 will bring about the opening of this door.

The actuating means of the device 1 additionally comprise a retainer for restraining the locking second end 4 of the operating member 2, this retainer here consisting of a rotary latch 9 and of two locking levers 44. The rotary latch 9 is mounted with the ability to rotate about the axis X, and the levers 44 are mounted with the ability to pivot on the fixed end-stop element 6, each pivoting about a pivot axle 40. The retainer is able to move between a closed position, in which the rotary latch 9 holds the levers 44 in a locking position (FIG. 12), and an open position, in which the rotary latch 9 releases the levers 44 (FIG. 13).

The fixed end-stop element 6 comprises two windows 56 that allow the levers 44 to pass when they are in the open position (FIG. 13). These windows 56 also each define an end-stop 57 against which the corresponding lever 44 comes into abutment when it is in this open position.

The operating member 2 is a telescopic element made up of a first-end tube 10 and of a second-end tube 11 able to slide one inside the other. In the present example, the first-end tube 10 has an outside diameter smaller than an inside diameter of the second-end tube 11 so that the first-end tube 10 can be inserted inside the second-end tube 11 over a nesting portion. A sliding bearing 12, made from a material having a low coefficient of friction, is also mounted between the first-end tube 10 and the second-end tube 11 so that the sliding of the first-end tube 10 with respect to the second-end tube 11 causes the sliding bearing 12 to slide against the internal walls of the second-end tube 11. A hole 35 made in the first-end tube 10 allows any condensate that might form inside the device 1 to be discharged. The telescopic nature of the operating member 2 allows for a function referred to as the service-opening function described later on. FIG. 14 depicts the device 1 with the operating member 2 in the service-opening position.

The first-end tube 10 thus constitutes the first end 3 of the operating member 2. The first-end tube 10 is additionally provided with a flange 13 collaborating with the flange 8 which, for its part, is made on the second-end tube 11. The two flanges 8, 13 collaborate in such a way that, when the spring 5 pushes on the operating member 2 (active state of the actuating means, see FIG. 13), the spring 5 bears against the flange 8 which itself bears against the flange 13 and therefore pushes back on the whole operating member 2, moving it away from the fixed end-stop element 6. The first-end tube 10 is therefore nested to its maximum extent inside the second-end tube 11, with the flanges 8, 13 butting against one another.

The whole of the operating member 2 (which is therefore made up of the first-end tube 10 and of the second-end tube 11) can move longitudinally, along the axis X, between the two extreme positions of FIGS. 12 and 13, when emergency opening is triggered. This movement of the operating member 2 is achieved by sliding of the operating member 2 inside an axis cylinder 15. The axis cylinder 15 is a cylinder fixed to the fixed end-stop element 6 by screw-fastening means 16. In this example, the flange 7 via which the spring 5 bears on the fixed end-stop element 6 is formed by an annulus projecting out from the axis cylinder 15. The fixed end-stop element 6 thus comprises: a body 55 equipped with the fixing holes 18 and on which the lever 44 is pivot-mounted; the flange 7 attached to the axis cylinder 15, the spring 5 bearing against the flange 7.

The axis cylinder 15 provides a sliding connection for guiding the operating member 2 longitudinally, along the axis X, by virtue of a sliding portion 17 provided on the second-end tube 11, the outside diameter of the sliding portion 17 being tailored to fit the inside diameter of the axis cylinder 15.

The operating member 2 performs its service-opening function, in addition to the emergency opening function, thanks to its telescopic nature, allowing the aircraft door to be opened and closed under normal conditions of use, namely outside of emergency opening periods, the emergency opening device being kept in a passive state, and the spring 5 remaining compressed. For this function, relative sliding between the first-end tube 10 and the second-end tube 11 along the axis X is possible thanks to the sliding bearing 12 described hereinabove.

When the device 1 is in the position of FIG. 12, the aircraft door is closed. Starting from this position, there are two ways in which the door can open:

an emergency opening mode in which the actuating means are activated. Expansion of the spring 5 will then cause the fixed end-stop element 6 and the second-end tube 11 to move apart (because of the flanges 7, 8). The flange 8 will additionally itself drive the flange 13, and therefore the first-end tube 10, along the axis X. The whole operating member 2 therefore arrives in the position of FIGS. 11 and 13, the door being opened as a result of the thrusting action of the spring 5;

a service-opening mode in which the first-end tube 10 slides freely inside the second-end tube 11, under the effect of the door being opened by an external action, as far as the position of FIG. 14 which corresponds to the full opening of the aircraft door.

In order to allow the operating member 2 to be locked in its position of FIGS. 10 and 12, the second end 4 of the operating member 2 is equipped with a keeper which in this instance consists of a groove 42 made in the second-end tube 11. The groove 42 has a stop surface 43 substantially orthogonal to the axis X.

FIG. 15 is an enlarged view of the rectangle XV of FIG. 14. In this locked position, the rotary latch 9 is in the closed position and therefore restrains the levers 44 in a locked position. In this locked position, the levers 44 collaborate with the groove 42 to restrain the second end 4 of the operating member 2. The levers 44 each comprise a locking tooth 45 engaged against the stop surface 43 of the groove 42 so that as long as the levers 44 are kept in this locked position by the rotary latch 9, the operating member 2 is restrained by the levers 44.

The collaboration between the rotary latch 9 and the levers 44 will now be described with reference to FIGS. 15 and 16. The rotary latch 9 has an annular overall shape allowing it to be mounted with the ability to turn on the axis cylinder 15, so that the rotary latch 9 can be rotated with respect to the axis cylinder 15 in a rotation about the axis X. In this example, the rotary latch 9 is mounted on a sliding ring 22 having a low coefficient of friction. The rotary latch 9 is solidly attached to an activation means consisting of a control lever 31 allowing the latch 9 to be forced to rotate.

The rotary latch 9 is immobilized axially on the axis cylinder 15 by two sliding axial end-stops consisting of an axial stop flange 39 of the sliding ring 22 and of an elastic ring 46 mounted on the axis cylinder 15. The rotary latch 9 is thus in a non-sliding pivot connection on the axis cylinder 15. The sliding ring 22 allows the rotary latch 9 to rotate with respect to the axis cylinder 15 with very low friction force.

The rotary latch 9 comprises two blades 27 extending axially toward the levers 44. Each blade 27 forms a retaining surface 47 which is a portion of a cylinder which is centered on the axis X. In addition to the retaining surface 47, each blade 27 comprises an end-stop 48 for abutment in the locked position. On the retaining surface 47, at the opposite end to the end-stop 48, each blade 27 comprises a free edge 49 allowing release of the corresponding lever 44, as set out hereinafter.

The levers 44 additionally each comprise a rolling ring 25, mounted with the ability to rotate on the corresponding lever 44. Each rolling ring 25 is retained on the corresponding lever 44 by an end-stop at the end of the lever, consisting in this example of a nut 50 secured by a pin 51. The rolling rings 25 are preferably made from a material with a low coefficient of friction in order to minimize the forces as the rolling ring 25 rotates with respect to the corresponding lever 44.

When the retainer is in the closed position, the rotary latch 9 is in the locked position (see FIGS. 15 and 16) and the levers 44 are held in a locked position by the retaining surface 47 of the corresponding blade 27. In the locked position of the levers 44, the locking teeth 45 restrain the operating member 2 via its second end 4, by virtue of the stop surface 43 of the groove 42.

The rotary latch 9 is thus able to restrain the second end 4 of the second-end element 11 thanks to the blades 27, by pulling against the stop surface 43.

Figure 16:
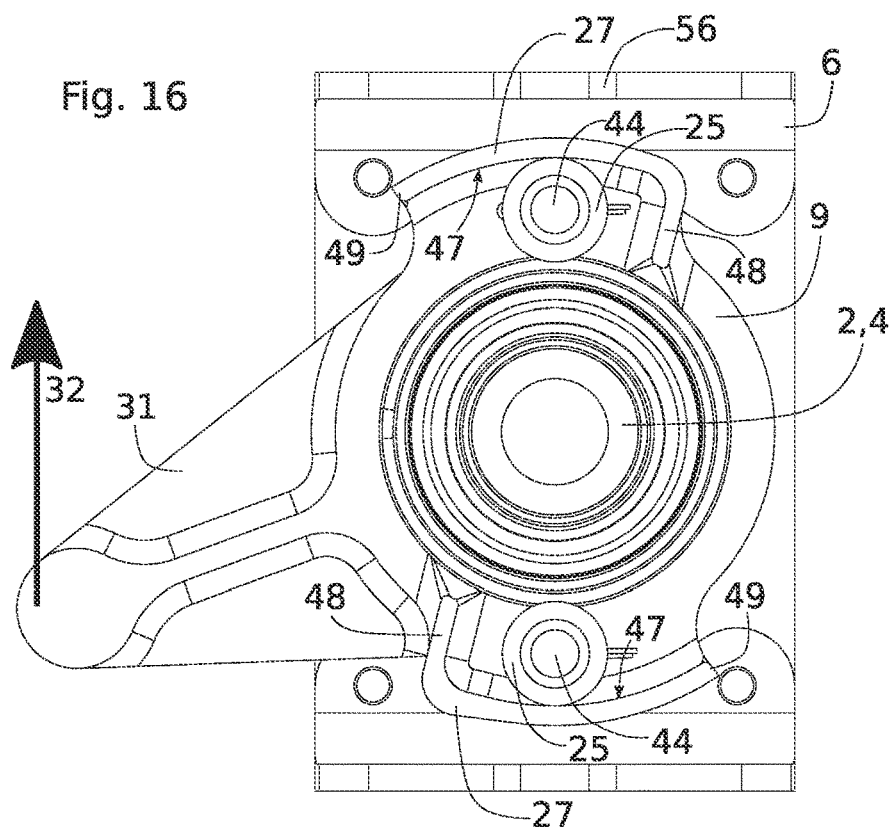
FIG. 16 is a face-on view of the retainer of the device in its position of FIG. 10.
Figure 17:
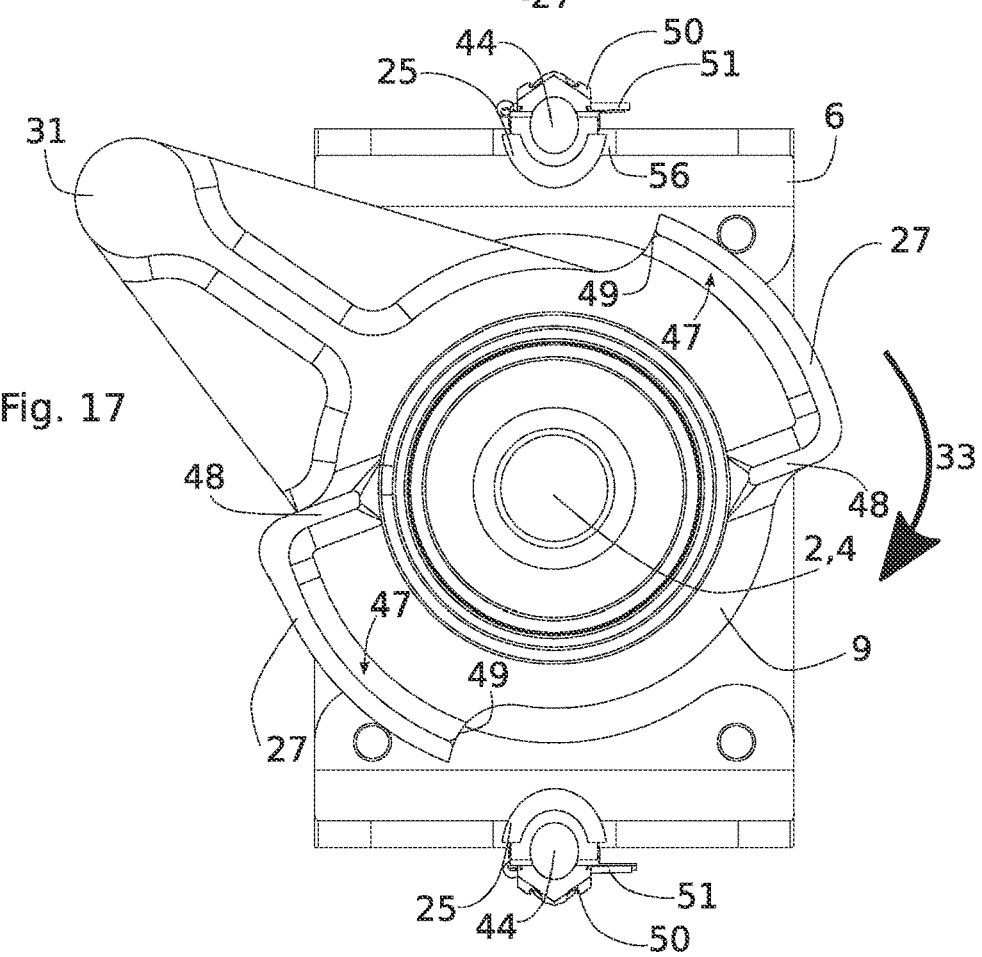
FIG. 17 is a face-on view of the retainer of the device in its position of FIG. 11.

When the emergency opening device 1 needs to be triggered, in the event of an emergency and with a view to evacuating the aircraft, a user actuates the control lever 31 by applying a force in the direction of the arrow 32 of FIG. 16, which causes the rotary latch 9 to rotate in the direction of the arrow 33. The rolling rings 25 of the levers 44 will then each roll over the retaining surface 47, under very little effort, toward the free edges 49. When the rolling rings 25 pass beyond the free edges 49, the levers 44 are no longer restrained by the rotary latch 9 (see FIG. 17). When the levers 44 are no longer restrained by the rotary latch 9, the spring 5 (which is constantly urging the stop surface 43 of the groove 42 against the locking teeth 45) causes the levers 44 to rotate about their axle 40 so that the locking teeth 45 move out of the groove 42 and the second end 4 of the operating member 2 is therefore no longer restrained. The spring 5 then causes the operating member 2 to move along the axis X as far as the position of FIG. 13, and therefore causes emergency opening of the door.

The rotary latch 9 thus constitutes a latch that can be opened under load because it allows the operating member 2 to be released in the emergency opening mode, this release being achieved without compressing the spring 5.

Optionally, the control lever 31 may also be secured against undesired triggering by a pin, such as a quick-release pin with spring-loaded ball.

Embodiment variants may be envisioned without departing from the scope of the invention. For example, the number of blades 27 and of levers 44 may vary, at least one hook lever 44 being needed to collaborate with the groove 42.

Activation of the emergency opening device 1 can be achieved by means other than a control lever 31, for example by a rack used to rotate the rotary latch 9.

Furthermore, the first and the second embodiment may be combined.

The invention claimed is:

1. An emergency opening device for an aircraft door fitted with an opening mechanism, the device comprising:
    an actuating device (2, 5) to actuate the opening mechanism, which switch between a passive state and an active state of activating the opening mechanism, and which comprise: a tubular operating member (2) provided with a first end (3) connected to the door, and with a locking second end (4); an elastic compression device (5) arranged between a fixed end-stop element (6) and the operating member (2); a retainer for restraining the locking second end (4) to move between a closed position of locking of the locking second end (4), in a position of the operating member (2) corresponding to the passive state of the actuating device in which position the elastic device (5) are kept compressed, and an open position of releasing of the locking second end (4) allowing the operating member (2) to move along an axis of movement (X) toward a position corresponding to the active state of the actuating device, under the effect of the force resulting from the expansion of the elastic device (5);
    an activating device for activating the actuating device (2, 5) designed to bring about the opening of the retainer;
    the emergency opening device comprising:
    a first-end element (10) and a second-end element (11) which are able to move freely relative to one another in translation along the axis of movement (X), the first end (3) of the operating member (2) being situated on the first-end element (10) and the locking second end (4) of the operating member (2) being situated on the second-end element (11);
    the fixed end-stop element (6) comprises a fixing device (18) for fixing it to an aircraft door element;
    an axis cylinder (15) extending along the axis of movement (X) is fixed to the fixed end-stop element (6), the second-end element (11) being mounted with the ability to slide along the axis of movement (X) on the axis cylinder (15);
    the retainer comprises a rotary latch (9) that opens under load capable of rotational motion about the axis of movement (X), the rotary latch (9) being axially fixed on the axis cylinder (15) between two axial end-stops, the rotary latch (9) being in non-sliding pivoting connection with the axis cylinder (15), the rotary latch (9) comprising at least one blade (27) extending parallel to the axis of movement (X) and designed to retain, by traction on a stop surface (30, 43), the locking second end (4) of the second-end element (11);

the activating device of the actuating device (2, 5) comprise a lever (31) solidly attached to the rotary latch (9) and allowing the latch (9) to be forced to rotate.

2. The device as claimed in claim 1, wherein the first-end element (10) and the second-end element (11) are mounted slidingly on one another.

3. The device as claimed in claim 1, wherein the first-end element (10) and the second-end element (11) are nested one inside the other.

4. The device as claimed in claim 3, wherein the first-end element (10) and the second-end element (11) includes tubular elements.

5. The device as claimed in claim 4, wherein the first-end element (10) and the second-end element (11) includes tubes, the tube constituting the first-end element (10) being inserted inside the tube constituting the second-end element (11).

6. The device as claimed in claim 3, wherein the operating member (2) comprises a sliding bearing (12) allowing the first-end element (10) to slide over the second-end element (11).

7. The device as claimed in claim 1, wherein the second-end element (11) comprises abutment means (8) for the elastic device (5).

8. The device as claimed in claim 7, wherein the abutment means for the elastic device comprise a flange (8) solidly attached to the second-end element (11).

9. The device as claimed in claim 7, wherein the elastic device (5) is positioned between the fixed end-stop element (6) and the abutment device (8).

10. The device as claimed in claim 7, wherein the first-end element (10) comprises an end-stop (13) collaborating with the abutment device (8) so that when the actuating device are in the active state, the second-end element (11) drives the first-end element (10).

11. The device as claimed in claim 10, wherein the end-stop comprises a flange (13) solidly attached to the second-end element (11).

12. The device as claimed claim 1, wherein the second-end element (11) comprises a sliding portion (17) tailored to fit the axis cylinder (15).

13. The device as claimed in claim 12, wherein the sliding portion (17) comprises a sliding bearing (37).

14. The device as claimed in claim 1, wherein the second-end element (11) is mounted with the ability to slide inside the axis cylinder (15).

15. The device as claimed in claim 14, wherein the second-end element (11) comprises a sliding portion (17) tailored to fit the axis cylinder (15).

16. The device as claimed in claim 1, wherein further comprises an end-of-travel stop (21) for the sliding of the operating member (2) with respect to the axis cylinder (15).

17. The device as claimed in claim 1, wherein the first-end element (10) comprises coupling device for coupling the device (1) to the door.

18. The device as claimed in claim 1, wherein the first-end element comprises a condensate discharge hole (35).

* * * * *